Oct. 7, 1958     C. E. HURLBURT ET AL     2,854,851

GYROSCOPE INSTRUMENTS

Filed May 17, 1954

INVENTORS
CHARLES E. HURLBURT
SHELDON M. WALDOW
BY
*Geo. G. Hyde*
ATTORNEY

United States Patent Office 2,854,851
Patented Oct. 7, 1958

2,854,851

GYROSCOPE INSTRUMENTS

Charles E. Hurlburt, River Edge, and Sheldon M. Waldow, Fort Lee, N. J., assignors to Bendix Aviation Corporation, Teterboro, N. J., a corporation of Delaware Application May 17, 1954, Serial No. 430,269

13 Claims. (Cl. 74—5.47)

This invention relates to instruments adapted for use on aircraft and the like, and particularly to instruments incorporating gyroscopes. Such craft during operation are subject to oscillation about an axis, and particularly to rolling; and as such instruments are nearly always located well above the axis, they are subjected not only to tilting in opposite directions but also to substantial transverse movement involving horizontal acceleration and deceleration.

It was found that when such an instrument is used for indicating direction in azimuth, as in so-called gyrocompasses, and the gyroscope is maintained in the desired attitude by an erection system including a gravity-responsive device, such as a pendulum, the rolling motion of the craft produces a substantial precession in azimuth that requires corresponding correction and is undesirable.

An object of the invention is to provide an arrangement that will substantially reduce the precession in azimuth under the indicated conditions.

Another object is to provide a gyroscope erecting system having novel means for materially reducing the effect of rocking movement on the system. A more specific object is to provide a system in which the effects of rocking will cancel out.

A further object is to provide an erecting system in which the azimuth precessing forces are produced alternately in opposite directions. Another purpose is to provide a system in which the precessing forces are accumulated over a period of more than one rocking cycle before being applied to precess the gyroscope.

The invention is applicable to an erecting system of the type in which precessing forces are applied continuously and alternately in opposite directions. A purpose of the invention is to provide a system in which the precessive effects produced by a gravity-responsive device are accumulated over a period of more than one roll cycle and applied in one direction, and such effects are then accumulated over a similar period and applied in the opposite direction in cyclic sequence.

Another cause of precession in azimuth in gyroscope instruments of this type is friction in the inner horizontal trunnion bearings. An object of the invention is in general to reduce the precessive effect of this factor. It has been found in practice that in previous system, when the instrument is mounted in an airplane, the rate of azimuth precession when the plane is on the ground differs from the rate when the plane is in flight, presenting serious difficulties in calibration and correction. Another object of the invention is to provide a system in which the azimuth precession rate is substantially the same when the instrument support is stationary as when it is in motion; and more specifically one in which the precession rate of the instrument when mounted in an airplane is substantially the same on the ground and in flight.

The foregoing and other objects and advantages of the invention will appear more fully from consideration of the detailed description which follows, taken with the accompanying drawing wherein one embodiment of the invention is illustrated. It is to be expressly understood, however, that the drawing is for the purposes of illustration and description, and is not to be construed as defining the limits of the invention.

Figure 3:
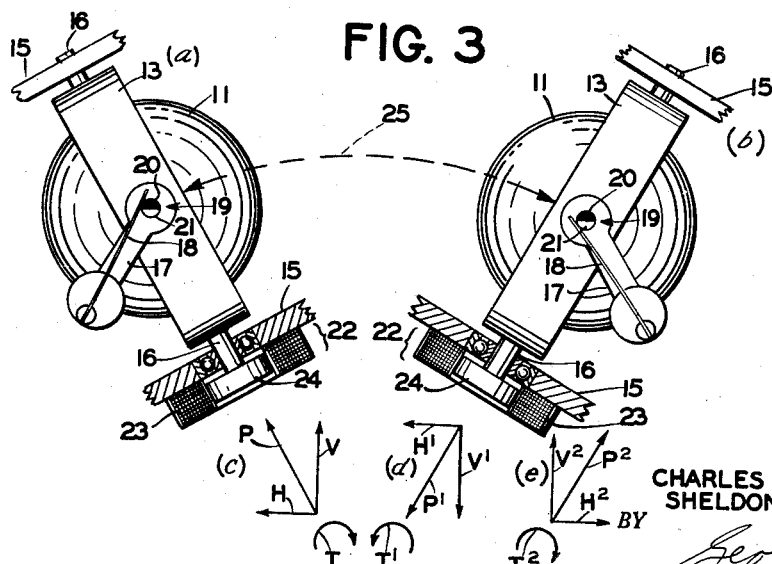

Fig. 3 is a diagram illustrating the operation of the invention, Figs. 3(a) and (b) being diagrammatic end elevations of the gyroscope at opposite ends of a rocking movement, Figs. 3(c) and (d) are vector diagrams of the precession forces in these two positions under prior conditions and Fig. 3(e) is a vector diagram of the precession forces on the gyroscope in position 3(b) in accordance with the invention.

While the invention in its broader aspects is applicable to various types of gyroscopes with different mountings, orientations and erection systems, its principles are illustrated in its application to a directional gyroscope of the type having a rotor with a horizontal spin axis pivotally mounted in a gimbal by horizontal trunnions at right angles to the spin axis, the gimbal being mounted through vertical trunnions in a suitable support or frame attached to the moving craft, such as an airplane. In accordance with usual practice a course indicator, such as a dial marked in degrees, in adjustably attached to the gimbal so that it can be rotated to designate the desired course with reference to a lubber's line, without shifting the gyroscope. With this arrangement it will be understood that the orientation of the spin axis in azimuth is unimportant, as long as it maintains the same orientation; and its alignment with the horizontal does not materially affect operation, provided that deviations from the horizontal are not excessive.

One embodiment of this type is illustrated, and includes a rotor 10 driven by any of the known methods (not shown), mounted in spherical casing 11 for rotation about a generally horizontal spin axis indicated at 12. Casing 11 is rotatably mounted in gimbal 13 by inner horizontal trunnions 14, and gimbal 13 is rotatably mounted by outer vertical trunnions 16 in frame 15, which is fixed to the aircraft or other moving support.

A gravity-operated erection-controlling device responsive to deviations of spin axis 12 from the horizontal is provided. As shown, it comprises a pendulum 17 pivoted on an inner trunnion 14 and carrying an insulated brush 18 bearing against contact block 19 fixed coaxially to the associated trunnion 14. Block 19 is arranged with two arcuate zones along the contact path of brush 18, the zones meeting at the point where the brush makes contact when spin axis 12 is horizontal and pendulum 17 is vertical. In the preferred form one zone provides electrical contact and the other is insulated, conveniently arranged by employing a cylinder block 19 with one half 20 made of insulation and the other half 21 of conducting metal, with brush 18 bearing against the periphery of the block 19.

A suitable device 22 controlled by pendulum 17 and generally termed a torquer is provided for applying torque to an outer vertical trunnion 16 and thereby precessing rotor 10 with relation to the horizontal attitude of spin axis 12. Torquer 22 is connected by a circuit hereafter described to brush 18 and contact block 19 in such a way that when the brush is in one zone, the torquer applies precession in one direction and when the brush is in the other zone, such torque is applied in the opposite direction.

With this arrangement torquer 22 is constantly exerting precession torque, but the spin axis 12 normally oscillates between an attitude slightly inclined to the horizontal in one direction and an attitude slightly inclined in the other direction, brush 18 contacting sections 20 and 21 alternately at regular intervals. This arrangement has been found to have certain technical advantages not necessary to enumerate here; and the apparatus is so sensitive that the slight deviations of axis 12 from the horizontal are immaterial in practice. When another factor causes axis 12 to deviate from the horizontal, block 19 will be correspondingly rotated, shifting brush 18 farther into one of the contact zones so that torquer 22 will be energized longer in the direction controlled by that zone, than in the other direction, producing a resultant precessive force in the proper direction to correct the deviation.

Accurate operation of this system in the manner just described is dependent upon maintaining pendulum 17 in vertical position. An error is however introduced by acceleration and deceleration of the instrument, which cause pendulum 17 to swing away from the vertical and thereby upset the balance between the precessive forces in opposite directions. This condition is encountered when the craft on which the instrument is mounted is subject to rocking movement about an axis substantially below the position of the gyroscope, as is generally the case. The word "rocking" will be used herein to indicate oscillation across a vertical axis about a center substantially above or below the gyroscope, so that the motion includes not only a change in the angle of the line through the outer trunnions 16 relative to the vertical, but also substantial transverse movement involving acceleration and deceleration. Rocking movement of this type, illustrated in Figs. 3(a) and (b) is of the type characteristic of the cyclic rolling movement of airplanes, ships and other craft, the gyroscope being illustrated at opposite ends of the rocking path.

It has been found that movement of this type introduces an error involving constant precession in azimuth in one direction which is substantially objectionable, since it requires frequent and substantial correction of the dial reading to compensate for the error. It is believed that this error is due to conditions indicated in Figs. 3(c) and (d), which illustrate an analysis of the various forces affecting the precession system operative in the two positions shown in Figs. 3(a) and (b) respectively.

It will be noted that in the position at the left end of the swing along rocking path 25, illustrated in Fig. 3(a), deceleration will shift pendulum 17 to the left of its normal vertical position, shifting brush 18 upwardly onto insulating sector 20 of the contact block, thereby actuating the torquer 22 in one direction. The torquer, which includes a stator 23 mounted on frame 15 and an associated rotor 24 fixed to an outer trunnion 16, will of course exert its torque transversely to the latter trunnion, as indicated by the arcuate arrow T. This will exert on spin axis 12 a precessive force in one direction, indicated by the precession vector line P extending parallel to trunnion 16. Since the gimbal 13 is tilted in this position, the force P may be resolved into a vertical upward vector V and a horizontal leftward vector H.

When the gyroscope swings to the other end of its rocking path, as shown in Fig. 3(b), the pendulum 17 will be swung to the right, brush 18 will contact the conducting sector 21 and torquer 22 will exert force in the opposite direction, indicated by arcuate arrow $T^1$, so that precessive force $P^1$ on spin axis 12 will be in the opposite direction from force P, the arrow $P^1$ extending downwardly. It may similarly be resolved into a vertical downward vector $V^1$ and a leftward horizontal vector $H^1$.

The diagrams show that under these circumstances the precessive forces at opposite sides of the rocking path include vertical vectors which cancel each other and horizontal vectors which are cumulative, since they extend in the same direction. It is these latter vectors which are believed to be the cause of the steady precession in azimuth that introduces the error above set forth.

According to the invention, this error is substantially reduced or eliminated by an arrangement of the circuit which actuates torquer 22 so that it will not operate in opposite directions at opposite sides of the swing path, but will operate in the same direction at both sides for a period of at least one rocking cycle. The effect of this arrangement is illustrated in Fig. 3(e), in which the direction of the torque is indicated by dotted arrow $T^2$ at the right of the swing. This direction is the same as that at the left of the swing indicated by arrow T. Under these circumstances the arrow $P^2$, indicating the precessive force, extends upwardly instead of downwardly as in Fig. 3(d), the vertical vector $V^2$ extending upwardly and the horizontal vector $H^2$ to the right. Under these conditions vector $H^2$ cancels vector $H^1$, with the desired result. While vectors V and $V^2$ are cumulative in effect, this involves not only the deviation of spin axis 12 from the horizontal, which within reasonable limits has no appreciable effect on the operation of the direction indicator, and indeed has certain advantages as hereafter set forth.

It should be noted that the vector diagrams just described are simplified to indicate only the linear portions of the various forces which are pertinent to the invention. While these forces involve rotational factors, such factors have been omitted as unnecessary to show for present purposes.

These results are in general accomplished by providing a system in which the effect of the deviations of thte pendulum at the opposite sides of each swing, instead of being operative to reverse the direction of torque as illustrated in Figs. 3(c) and (d), are accumulated in a storage or delay arrangement. The resultant after a period of more than one complete rock cycle, and advantageously continuing through several such cycle, is applied to reverse the direction of torque, the effect during such reversal being again accumulated during a similar period before the torque is returned to its previous direction. While this may be accomplished in different ways, in the embodiment shown this result is produced by introducing a delay network into the torquer operating circuit.

Figure 1:
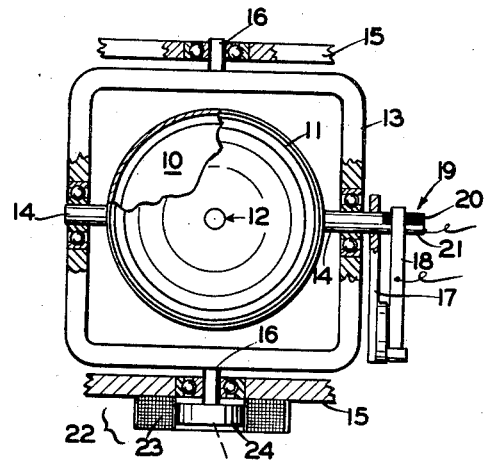
Fig. 1 is a diagrammatic side elevation of a gyroscope with parts in section and broken away.
Figure 2:
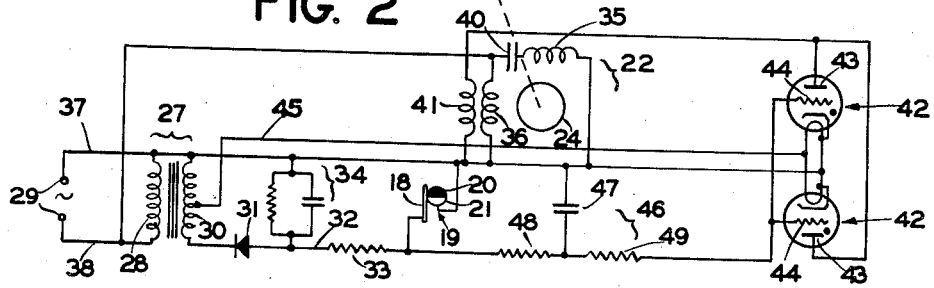
Fig. 2 is a diagram of a precessing circuit embodying the invention.

The latter circuit, and the construction and operation of the torquer and the pendulum switch, are similar to those disclosed in application Serial No. 220,034, Konet and Hurlburt, filed April 9, 1951, for Servo System. In the slightly modified circuit illustrated in Fig. 2, a transformer 27 includes a primary 28 connected to an alternating current source 29 and a secondary 30 having one end connected through rectifier 31 in line 32, and resistor 33 in said line, to brush 18, the other end of secondary 30 being connected through line 37, which is also connected to an end of primary 28 and may be grounded, to the conducting section 21 of contact block 19. A suitable filter network 34 may be connected across the D. C. circuit if desired.

The stator 23 of torquer 22, as shown in the above mentioned application, preferably comprises a split phase induction motor having fixed windings 35 and 36 each connected at one end through lead 37 to source 29, with their other ends connected to the other lead 38 from said source to primary 28, one fixed winding, shown as winding 35, being connected through condenser 40 to provide the necessary phase split. With this arrangement the torquer 22 will apply torque to rotor 24 in one direction.

A bucking coil 41 is positioned in inductive opposition to one of the fixed windings, shown as winding 36, and is periodically energized through the pendulum switch. Winding 41 has substantially greater inductance than winding 36, so that when both are energized, winding 41 is effective and in conjunction with winding 35 will apply a resultant torque to rotor 24 in the opposite direction.

Bucking coil 41 is energized in the illustrated embodiment through a gas tube circuit fired from the pendulum switch. In the form illustrated, thyratrons 42 are connected in parallel, with their plates 43 connected to one end of bucking coil 41, their control grids 44 to one side of the pendulum switch circuit, shown as the brush 18, and their filaments and cathodes connected across lead 37 and a lead 45 connected to an intermediate point in a transformer secondary 30, arranged to provide the required filament current. The other side of bucking coil 41 is connected to lead 37.

A suitable delay circuit is introduced between the pendulum switch and the grids 44. As shown, the delay network 46 comprises a condenser 47 connected across leads 37 and 32, with resistors 48 and 49 in lead 32 at opposite sides of the condenser connection. The values of the components are of course selected to provide the required delay under any particular conditions a, delay amounting to the total time of five or six roll cycles having been found satisfactory.

In operation, in the absence of transverse motion which deflects pendulum 17 from its normal vertical position, brush 18 will be in contact with one of the sectors 20 or 21 when spin axis 12 is inclined to the horizontal. Assuming that brush 18 bears against insulated sector 20, the D. C. voltage across leads 37 and 32 will charge condenser 47 during a period determined by the capacity of said condenser and the resistance of the resistor 48 building up a voltage on the grids of thyratrons 42 through resistor 49 until the tubes fire, energizing bucking coil 41. During the charging period the brush will travel along the insulation segment 20.

When coil 41 is energized, the block 19 will start to rotate in the opposite direction, carrying brush 18 back until it contacts conducting segment 21. Condenser 47 will then discharge through the brush, segment 21 and resistor 48, the latter retarding the discharge until the brush 18 has traveled the requisite distance along segment 21. When the resultant drop in grid voltage cuts off tubes 42, the fixed windings 35 and 36 will take over, reversing the direction of precession, rotating block 19 until brush 18 contacts insulating segment 20, charging of condenser 47 recommences, and the cycle is repeated. The result, in the absence of disturbing factors, will be the vertical oscillation of spin axis 12 through an angle determined by the delay circuit and symmetrical with respect to the prescribed horizontal attitude of the axis. As already indicated, the increased angle of the vertical precessive oscillations does not affect the directional characteristics of the gyroscope, which are based on its horizontal orientation.

This cycle of switch operation will be maintained under rolling conditions illustrated in Fig. 3, the horizontal precession factors cancelling out while the effect of the vertical precession factors on the vertical angle will not materially affect the operation. Likewise, vertical deviation of the spin axis 12 from its correct attitude due to other factors will result in longer periods of contact by brush 18 with one of the switch sectors, producing a resultant torque effect that will return the axis to its correct attitude in the same manner as with the previous circuit arrangement indicated above.

As already noted, it has been found in practice that this system results in a reduction of precession in azimuth even when the gyroscope is not subjected to tilting or to transverse acceleration. This type of precession is due to a substantial extent to friction in the bearings for the inner horizontal trunnions of the gimbal, the friction naturally exerting a precessive force which shifts the gyro axis in azimuth. It is believed that the reduction of this precessive effect is due in part to the fact that the longer period of torque in each direction, and the resulting increase in the amplitude of precessive movement, result in a sufficient increase in the movement of the balls in the ball bearings for the horizontal trunnions so that smoother, less resistive trunnion support is provided. Another factor in this result may be the observed fact that when the airplane is in flight the switch pendulum is deflected laterally from its vertical position by the various incidental movements, vibrations and shocks which occur; and although these deviations are random, over a period of time the deflections in opposite directions balance each other in accordance with the principles above described. With previous systems these deviations would produce a steady precessive effect in azimuth; but with the present system azimuth precessive forces would cancel out as heretofore set forth.

However, regardless of the correctness of these explanations, the invention has been shown to result in a reduction in azimuth precession due to horizontal trunnion bearing friction. In particular, it has been found practical to provide a calibration for azimuth precession that will be adequately accurate both when the airplane is on the ground and when it is in flight. This is particularly important under certain practical conditions, and especially with jet fighter planes, which normally are on the ground a major portion of the time and in which it is generally impractical to provide the necessary check-up for calibration during the short and busy periods when they are in flight.

For convenience the gyroscope has been illustrated in Fig. 3 with gimbal 13 at right angles to the line of acceleration and deceleration, so that the latter forces have the maximum effect on pendulum 18. However, as already stated, gimbal 13 may have any azimuth angle when the direction indicator is set. When it is in line with the direction of acceleration, the latter force will of course have no effect on pendulum 18. Between that position and the one shown in Fig. 3 the force exerted by acceleration and deceleration on the pendulum tending to deflect it laterally will be a vector of the angle between the plane of the gimbal 13 and the direction of the accelerative force. However, this does not affect the principle of operation, since it varies only the degree to which this principle is effective, and therefore the showing has not been complicated by introducing this factor.

Although but one embodiment of the invention has been illustrated and described in detail, it is to be expressly understood that the invention is not limited thereto. Various changes can be made in the design and arrangements of the parts without departing from the spirit and scope of the invention as the same will now be understood by those skilled in the art. In particular, while a pendulum has been shown, certain features of the invention are applicable to other precession-actuating devices which are responsive to gravity and also to acceleration. Likewise, while the invention has unexpected advantages in directional gyroscope instruments of the same type as that above described, it includes features that are applicable to other types of gyroscopes and in particular to gyroscopes having other spin axis attitudes.

We claim:

1. A gyroscope instrument comprising a gyroscope having a prescribed attitude, and erection means for correcting deviations from said attitude, including means for alternately precessing the gyroscope in opposite directions and means for increasing the period of precession in each direction.

2. A gyroscope instrument comprising a gyroscope having a prescribed attitude, and erection means for correcting deviations from said attitude, comprising means for alternately precessing the gyroscope in opposite directions, including reversible torquing means and gravity responsive switch means for operating the torquing means alternately in opposite directions; and means for increasing the period of precession in each direction.

3. A gyroscope instrument comprising a gyroscope having a prescribed attitude, and erection means for correcting deviations from said attitude, comprising means for alternately precessing the gyroscope in opposite directions, including reversible torquing means, gravity responsive switch means and means for operating the torquing means, including a circuit controlling by the switch means, and a delay network in the circuit between the switch means and the torquing means.

4. A gyroscope instrument, comprising a gyroscope having a prescribed attitude, and erection means for correcting deviations from said attitude by precessing the gyroscope alternately in opposite directions, including electrical torquing means for applying precession torque in opposite directions, an energizing circuit connected to the torquing means, automatic control switch means connected to the circuit for operating the torquing means in opposite directions, and a time delay element in the circuit between the switch means and the torquing means, arranged to increase the period of operation of the torquing means in each direction.

5. A gyroscope instrument, comprising a frame, a gimbal having vertical trunnions journaled in the frame, a gyroscope having a prescribed horizontal attitude, a gyroscope support including horizontal trunnions journaled in the gimbal, a gravity responsive switch connected to and actuated by movement of the gyroscope support, torquing means connected to the gimbal for exerting precessive torque on the gimbal about the vertical trunnions in either direction, and means including a circuit connecting the switch and the torquing means for actuating the torquing means in a direction determined by the switch position, said circuit including means for delaying the effect of switch position on the torquing means and thereby extending the period of actuation of the torquing means in each direction.

6. A gyroscope instrument comprising a frame, a gimbal having vertical trunnions journaled in the frame, a gyroscope having a prescribed horizontal attitude, a gyroscope support including horizontal trunnions journaled in the gimbal, a gravity responsive switch having two positions, fixed to the gyroscope support and actuated between said positions by movement of the gyroscope support, precessing means including a reversible torquer connected to the gimbal, arranged to exert torque in either direction about the vertical trunnions, and means including a circuit connecting the switch and the torquer for actuating the torquer in one direction when the switch is in one position and in the opposite direction when the switch is in the other position, said circuit including means for delaying the effect of switch position on the torquing means and thereby extending the period of actuation of the torquing means by the switch in each direction.

7. A gyroscope instrument comprising a frame, a gimbal having vertical trunions journaled in the frame, a gyroscope, a gyroscope support including horizontal trunnions journaled in the gimbal, a gravity responsive switch fixed to the gyroscope support and including a pendulum shifted into either of two positions by rotation of the gyroscope support about the horizontal trunnions, gyroscope precessing means including torquing means connected to the gimbal for applying torque about the vertical trunnions in either direction, and means including a circuit connecting the switch and the torquing means for actuating the torquing means in a direction determined by the switch position, said circuit including means for delaying the effect of switch position on the torquing means and thereby extending the period of actuation of the torquing means in each direction.

8. A gyroscope instrument subject to cyclic accelerative movements and tilting alternately in opposite directions, comprising a gyroscope having a prescribed attitude, and erecting means for correcting deviations from said attitude, comprising precessing means for precessing the gyroscope in either of two opposite directions, means including an element responsive to gravity and to said accelerative movements for actuating the precessing means alternately in opposite directions, and means for maintaining the duration of operation of the precessing means in each direction for a period greater than a complete cycle of said accelerative movements.

9. A gyroscope instrument subject to cyclic accelerative movements alternately in opposite directions, comprising a gyroscope having a prescribed attitude, and erecting means for correcting deviations from said attitude, comprising means for applying precessive torque to the gyroscope in either of two opposite directions, switch means responsive to gravity and to said accelerative movements, means responsive to the switch means for actuating the precessing means to exert torque continuously and alternately in opposite directions, and means for maintaining the duration of operation of the precessing means in each direction for a period greater than a complete cycle of said accelerative movements.

10. A gyroscope instrument subject to cyclic accelerative movements and tilting alternately in opposite directions, comprising a frame, a gimbal pivotally mounted on the frame, a gyroscope support pivotally mounted on the gimbal at right angles to the gimbal pivot mounting, a gyroscope mounted on the support and having a prescribed attitude, and erecting means for correcting deviations from said attitude, comprising a torquer engaging the gimbal, and means for operating the torquer alternately in opposite directions, including switch means responsive to gravity and to said accelerative movements and carried by the gyroscope support, and circuit means connecting the switch means to the torquer, including time control means for maintaining said torquer in operation in one direction for a period at least as long as one complete cycle of said accelerative movements.

11. A gyroscope instrument subject to cyclic accelerative movements and tilting alternately in opposite directions, comprising a gyroscope having a prescribed attitude, and erecting means for correcting deviations from said attitude, comprising precessing means for precessing the gyroscope in either of two opposite directions, and means for actuating the precessing means alternately in opposite directions, including switch means responsive to gravity and to said accelerative movements, an actuating circuit connecting the switch means to the precessing means, and a time delay network in the circuit having a delay period at least as long as one complete cycle of said movements.

12. A gyroscope instrument subject to cyclic accelerative movements and tilting alternately in opposite directions, comprising a gyroscope having a prescribed attitude, and erecting means for correcting deviations from said attitude, comprising precessing means for precessing the gyroscope in either of two opposite directions and means for actuating the precessing means alternately in opposite directions, including switch means responsive to gravity and to said accelerative movements, an actuating circuit connected to a source of electrical energy and to said actuating means and switch, a delay network in the circuit including a condenser connected across the switch, arranged for alternate charging and discharging by operation of the switch, and said condenser so connected in the delay network as to render the means for actuating the precessing means effective in response to a predetermined voltage across the condenser.

13. An azimuth direction indicating gyroscope instrument subject to cyclic horizontal accelerative movements and tilting in opposite directions, comprising a frame, a gimbal pivotally mounted on the frame on a vertical axis, a gyro support pivotally mounted on the gimbal on a horizontal axis, a gyro on the support having a prescribed attitude with a horizontal spin axis at right angles to said horizontal axis, and means for correcting deviations from said attitude, including a torquer engaging the gimbal, and means for operating the torquer continuously and alternately in opposite directions, comprising an actuating circuit connected to a source of energy, a first torquer motor unit connected to and energized by the circuit, arranged to apply continuous torque in one direction, a second torquer unit arranged to apply torque in the other direction, means for intermittently energizing the second torquer unit from the circuit, including a switch responsive to gravity and said accelerative movements; and a delay network to retard the energization of the second torque unit by said last-mentioned means.

References Cited in the file of this patent

UNITED STATES PATENTS 2,645,942    Hurlburt et al.    July 21, 1953

FOREIGN PATENTS 612,608    Great Britain    Nov. 16, 1948

UNITED STATES PATENT OFFICE
CERTIFICATE OF CORRECTION

Patent No. 2,854,851            October 7, 1958

Charles E. Hurlburt et al.

It is hereby certified that error appears in the printed specification of the above numbered patent requiring correction and that the said Letters Patent should read as corrected below.

Column 6, line 75, for "controlling" read -- controlled --.

Signed and sealed this 30th day of December 1958.

(SEAL)
Attest:

KARL H. AXLINE
Attesting Officer

ROBERT C. WATSON
Commissioner of Patents